United States Patent
Weinstein et al.

(10) Patent No.: US 8,319,833 B2
(45) Date of Patent: Nov. 27, 2012

(54) VIDEO SURVEILLANCE SYSTEM

(75) Inventors: Richard D. Weinstein, St. Louis, MO (US); Rickie L. Sauer, St. Louis, MO (US)

(73) Assignee: Sentrus, Inc., Chesterfield, MO (US)

(*) Notice: Subject to any disclaimer, the term of this patent is extended or adjusted under 35 U.S.C. 154(b) by 589 days.

(21) Appl. No.: 12/489,717

(22) Filed: Jun. 23, 2009

(65) Prior Publication Data

US 2010/0321463 A1    Dec. 23, 2010

(51) Int. Cl.
- H04N 7/14 (2006.01)
- H04N 7/18 (2006.01)
- G01M 17/00 (2006.01)
- G06F 7/00 (2006.01)
- G06F 19/00 (2006.01)

(52) U.S. Cl. .......... 348/143; 348/14.01; 701/31.4; 701/117

(58) Field of Classification Search .......... 348/14.01, 348/143
See application file for complete search history.

(56) References Cited

U.S. PATENT DOCUMENTS

| | | | |
|---|---|---|---|
| 7,382,244 | B1 | 6/2008 | Donovan et al. |
| 7,397,368 | B2 | 7/2008 | Otto et al. |
| 7,456,727 | B2 | 11/2008 | Pinter et al. |
| 7,460,148 | B1 | 12/2008 | Clark et al. |
| 7,460,689 | B1 | 12/2008 | Chan |
| 7,468,662 | B2 | 12/2008 | Velipasalar et al. |
| 7,479,980 | B2 | 1/2009 | Merheim et al. |
| 7,480,715 | B1 | 1/2009 | Barker et al. |
| 7,492,821 | B2 | 2/2009 | Berman et al. |
| 7,508,418 | B2 | 3/2009 | Renkis |
| 7,508,941 | B1 | 3/2009 | O'Toole, Jr. et al. |
| 7,511,612 | B1 | 3/2009 | Monroe |
| 7,515,042 | B2 | 4/2009 | Benco et al. |
| 7,542,588 | B2 | 6/2009 | Ekin et al. |

(Continued)

FOREIGN PATENT DOCUMENTS

EP    682331    11/1995

(Continued)

OTHER PUBLICATIONS

B. Edge. "GXF—The General Exhange Format". EBU Technical Review. (2002). Special Issue. pp. 1-9.

(Continued)

*Primary Examiner* — Andy Rao
*Assistant Examiner* — Hee-Yong Kim
(74) *Attorney, Agent, or Firm* — Polster, Lieder, Woodruff & Luechesi, L.C.

(57) ABSTRACT

A surveillance system (10) that can be used covertly or overtly for observing a remote location (A) and providing information about events occurring at that location. Sensor (100-208) are used to obtain real time information about events at the location. The sensors include imaging devices, audio equipment and sensor detecting the presence of explosives or NBC materials. A transmitter (14) converts outputs from the sensors into a secure format and the resultant information is transmitted from the remote location to another location (B) distant from the location under surveillance. At this distant location, the information is converted into a video display format and is displayed, in real time, to one or more users of the system. This enables the users to be able to immediately respond to what is happening, or not happening, at the remote location and to undertake appropriate action in response to the immediate situation at the remote location.

29 Claims, 3 Drawing Sheets

U.S. PATENT DOCUMENTS

| | | | |
|---|---|---|---|
| 7,543,327 B1 | 6/2009 | Kaplinsky | |
| 7,546,624 B2 | 6/2009 | Vishloff et al. | |
| 7,548,258 B2 | 6/2009 | Kaplinsky | |
| 7,548,803 B2 | 6/2009 | MacCarthy | |
| 7,551,075 B1 | 6/2009 | Monroe | |
| 7,561,037 B1 | 7/2009 | Monroe | |
| 7,577,199 B1 | 8/2009 | Herz | |
| 7,581,702 B2 | 9/2009 | Olson et al. | |
| 7,603,087 B1 | 10/2009 | Renkis | |
| 2004/0223056 A1* | 11/2004 | Norris, Jr. | 348/152 |
| 2006/0026017 A1* | 2/2006 | Walker | 705/1 |
| 2006/0095199 A1* | 5/2006 | Lagassey | 701/117 |
| 2006/0253885 A1* | 11/2006 | Murphy et al. | 725/105 |
| 2007/0075849 A1* | 4/2007 | Pitt | 340/426.2 |
| 2007/0167879 A1* | 7/2007 | Cochran | 600/595 |
| 2010/0211423 A1* | 8/2010 | Hehmeyer | 705/7 |

FOREIGN PATENT DOCUMENTS

| | | |
|---|---|---|
| EP | 805426 | 5/1997 |
| EP | 884891 | 12/1998 |
| EP | 917359 | 5/1999 |
| EP | 1126715 | 8/2001 |
| GB | 2250156 | 5/1992 |
| GB | 2251780 | 7/1992 |
| GB | 2253534 | 9/1992 |
| GB | 2256771 | 12/1992 |
| GB | 2296156 | 6/1996 |
| GB | 2360898 | 3/2001 |
| GB | 2360608 | 9/2001 |
| GB | 2363936 | 1/2002 |
| JP | 1275237 | 11/1989 |
| JP | 7075056 | 3/1995 |
| JP | 9305891 | 11/1997 |
| JP | 11038482 | 2/1999 |
| JP | 11088759 | 3/1999 |
| JP | 11154292 | 6/1999 |
| JP | 2000101966 | 4/2000 |
| JP | 2000253388 | 9/2000 |
| JP | 2000270330 | 9/2000 |
| JP | 2000333152 | 11/2000 |
| JP | 200350183 | 12/2000 |
| JP | 2001008072 | 1/2001 |
| JP | 2001333389 | 11/2001 |
| WO | 9504431 | 2/1995 |
| WO | 9718542 | 5/1997 |
| WO | 9914882 | 3/1999 |

OTHER PUBLICATIONS

G. Yang, C. Sun, C. Wrigley, D. Stack, C. Kramer and B. Pain. "Dynamically Reconfigurable Imager for Real-Time Staring Vision Systems". Battlespace Digitalization and Network-Centric Warfare Conference. (2001). Orlando, Florida. pp. L3-1-L3-4.

L. Klein . "Evaluation of Mobile Surveillance and Wireless Communication Systems: Field Operational Test". California Path Program. Institute of Transportation Studies. (1999). No. 1683. pp. 14-21.

R. G. Baker and J. Mosley. "Enhanced Electronic Camera". IBM Technical Disclosure Bulletin. (1995). vol. 38, No. 3. pp. 53-54.

* cited by examiner

VIDEO SURVEILLANCE SYSTEM

CROSS REFERENCE TO RELATED APPLICATIONS

U.S. patent application Ser. No. 12/475,167 filed May 29, 2009

STATEMENT REGARDING FEDERALLY SPONSORED RESEARCH OR DEVELOPMENT

N/A

BACKGROUND OF THE INVENTION

This invention relates to remote video surveillance systems which can be used covertly or overtly; and more particularly, to an advanced video surveillance system having enhanced surveillance and monitoring capabilities, as well additional features providing the user a wide range of operational capabilities regardless of the environment in which the system is used.

In U.S. Pat. No. 7,051,356 (the '356 patent), there is described a remote, wireless video surveillance system and method. As described therein, fixed covert imaging means (e.g., cameras) generate analog electrical signals representing images of real time occurrences at a remote location under surveillance. Those skilled in the art will appreciate that this includes not only the presence of people and/or things, but their absence as well. The analog signals are converted to digital signals, which are sent via an internet protocol (IP) format, and transmitted from the remote location to a receiver located a relatively short distance away. There, the signals are processed for further transmission to a base location of the surveillance system. Here, they are converted into a digital video format and simultaneously displayed to one or more viewers on their (IBM standards) computer displays. Because the captured images are displayed in real time to the viewers, the viewers are able to immediately react or respond to what is happening (or not happening) at the remote location and to authorize and undertake appropriate action in response to the immediate situation thereat.

The system, as described in the '356 patent has, as noted, been utilized for covert and overt surveillance by the military, as well as in civilian and commercial applications. An example of overt, civilian applications is where, for example, police, fire, and emergency responders, have needed to remotely observe what is happening in an area where; the ability of the system to provide real time information is crucial because these groups have limited resources that need to be expended where they are most needed; rather than in a more "scattergun" approach which often happens because of the lack of up-to-date, real time information about what is occurring and where.

Despite the advantages of the system taught by the '356 patent, it has been recognized that improvements to the system will produce greater flexibility as well as give it greater capabilities when used either covertly or overtly.

BRIEF SUMMARY OF THE INVENTION

The present invention is directed to improvements and advances in a surveillance system capable of capturing and archiving real time video and audio at a remote location. As now implemented, the system includes a variety of sensors including multi-mode aerial and ground based sensors. These sensors not only detect the motion of humans as well as vehicles and other metallic and non-metallic objects, but explosions, and the presence of nuclear, biological, and chemical (i.e., "NBC") materials.

Video is captured using both fixed imaging devices which, in covert applications, are appropriately concealed, as well as hand held and mobile imaging devices for both covert and overt applications including the sensing of explosives and other materials.

The system incorporates a global positioning system (GPS) for precisely identifying the location of sensors, and further has a ground radar capability.

The system transmits information (images, audio, sensor outputs) from the remote location to a base unit for simultaneous, real time, provision of this information to one or more users. Besides real time viewing or listening, all the transmitted information is stored and archived for subsequent use. The system has both point-to-point (PTP) and point-to-multipoint (PTMP) communication capabilities, and further is incorporated as a mesh topology for timely providing information to users despite any (single point failure) breakdowns or problems in a particular communications pathway. Communications are provided in one or more frequency bands ranging from 300 MHz up to 40 GHz.

Real time communication of audio, video and sensor information is sent to multiple viewing locations for simultaneous listening, viewing, and recordation. These locations are land, sea, and air based. With regard to the latter, the system uses, for example, an integrated aerial platform including both aerostat and satellite communications. The information is encrypted or encoded in a secure (IP) format prior to transmission. Communications include, for example, voice over internet protocol (VOIP) telephony. The system integrates land mobile communication platforms; and, as part of the mesh topology it affects, links disparate systems together into a comprehensive communications system which facilitates two-way communications, including two-way voice communication. This latter feature is useful for mobile land communications and facilitates the linking of disparate two-way radio voice and data communications systems.

Particularly in covert environments, the surveillance system employs small, clandestine devices. These include, as an option, explosive devices which the system detonates in response to the occurrence of a series of predetermined actionable events. For non-explosive devices, the system activates a respective device also in response to the occurrence of a series of predetermined events. With certain devices, the system provides both remote targeting and silent actuation capabilities.

The system incorporates a "sleep" mode for power conservation. Power-up can either be by command from a control center, or by remote audio. It can also occur in response to alarms from other ground based sensors. When power-up occurs, the system is powered-up in a predefined operating condition. The system is battery powered, but can also be powered using other sources that do not require frequent attention to the platform. Particularly in covert environments, the system can be left unattended for long periods without detracting from its overall performance capabilities. Sleep is induced to either increase time-on-station by reducing the load on the battery source or to reduce EMI/RFI during counterintelligence activity.

Those devices installed at a remote location are readily transported, and easily installed and integrated with the remainder of the system so the system is quickly up and running. The system provides a great degree of flexibility to the user as regards monitoring the remote site and responding to occurrences at the remote site. When no longer required, the system is quickly dismantled for transport, installation, and use at another site.

Other objects and features will be in part apparent and in part pointed out hereinafter.

BRIEF DESCRIPTION OF THE SEVERAL VIEWS OF THE DRAWINGS

The objects of the invention are achieved as set forth in the illustrative embodiments shown in the drawings which form a part of the specification.

Corresponding reference characters indicate corresponding parts throughout the several views of the drawings.

DETAILED DESCRIPTION OF INVENTION

Figure 1:
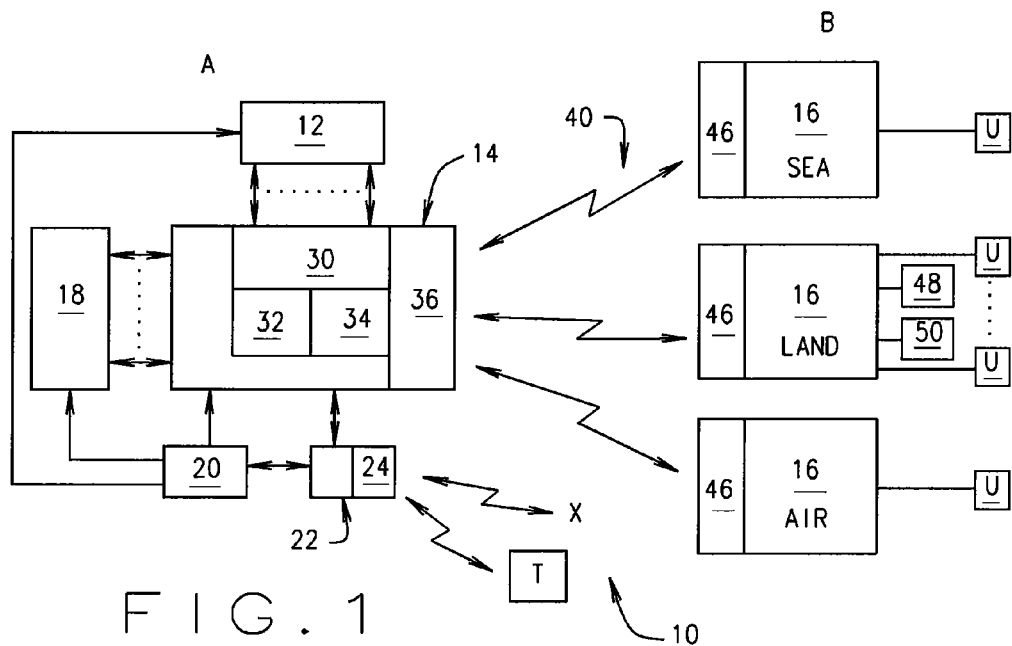
FIG. 1 is a representation of a surveillance system of the present invention.

The following detailed description illustrates the invention by way of example and not by way of limitation. This description clearly enables one skilled in the art to make and use the invention, and describes several embodiments, adaptations, variations, alternatives and uses of the invention, including what is presently believed to be the best mode of carrying out the invention. Additionally, it is to be understood that the invention is not limited in its application to the details of construction and the arrangement of components set forth in the following description or illustrated in the drawings. The invention is capable of other embodiments and of being practiced or carried out in various ways. Also, it will be understood that the phraseology and terminology used herein is for the purpose of description and should not be regarded as limiting.

Referring to the drawings, an advanced surveillance system of the present invention is indicated generally 10. As indicated in FIG. 1, system 10 comprises a plurality of modules by which the surveillance system, rather used overtly or covertly, obtains information concerning events, activities, or happenings at a remote location A, or a number of remote locations, of interest. In this regard, it will be understood by those skilled in the art that this also includes the lack of events, activities, or happenings occurring at the remote location or locations.

Surveillance system 10 first includes a sensor means 12 for obtaining real time information about occurrences or non-occurrences at location A. The sensor means includes a suite of different sensors, detectors, and other devices by which different types of information about what is happening, or not happening, at the location is obtained.

Next, surveillance system 10 includes a transmission means 14 for converting outputs from the sensor means into a secure format. The transmission means then transmits the resultant information, which is now encrypted, over internet protocol (IP) wireless networks from remote location A to another location B which is distant from the remote location.

At location B, surveillance system 10 employs means 16 for converting the information about location A into a video display format and for displaying the information, in real time, to at least one user U. In this regard, it will be understood by those skilled in the art that "real time" means instantaneous viewing of the video images and other information obtained at the remote location, as these images occur and the information is obtained. Thus, in addition to video images, representations of other types of outputs obtained from sensor means 12 are also displayed, in real time, for viewing by the user or users. This enables the user(s) to be able to immediately respond to what is happening, or not happening, at the location A and to undertake appropriate action in response to the immediate situation at the remote location.

Also located at remote location A are action means 18 for performing a predetermined function in response to a command from the location B based on a response from users of surveillance system 10, or from other sources. As previously noted, surveillance system 10 can be used in a covert manner in war zones, combat areas, areas of insurgency, etc. And, it can also be used overtly by civilian authorities in disaster areas resulting from hurricanes, flooding, etc. Those skilled in the art will accordingly appreciate that certain types of action means may be used in the one application, while other types of action means are used in the other application.

A power means 20 at location A is for powering surveillance system 10. The power means includes a sleep mode during which the surveillance system is deactivated. This helps conserve power. In addition, when activated by power means 20, surveillance system 10 is powered up in a predetermined operating configuration or status.

Next, the surveillance system includes an activation means 22. This means is responsive to an alarm or other predetermined input received from a predetermined source, which can be distant location B, or other source X, for activating the surveillance system.

Figure 2:
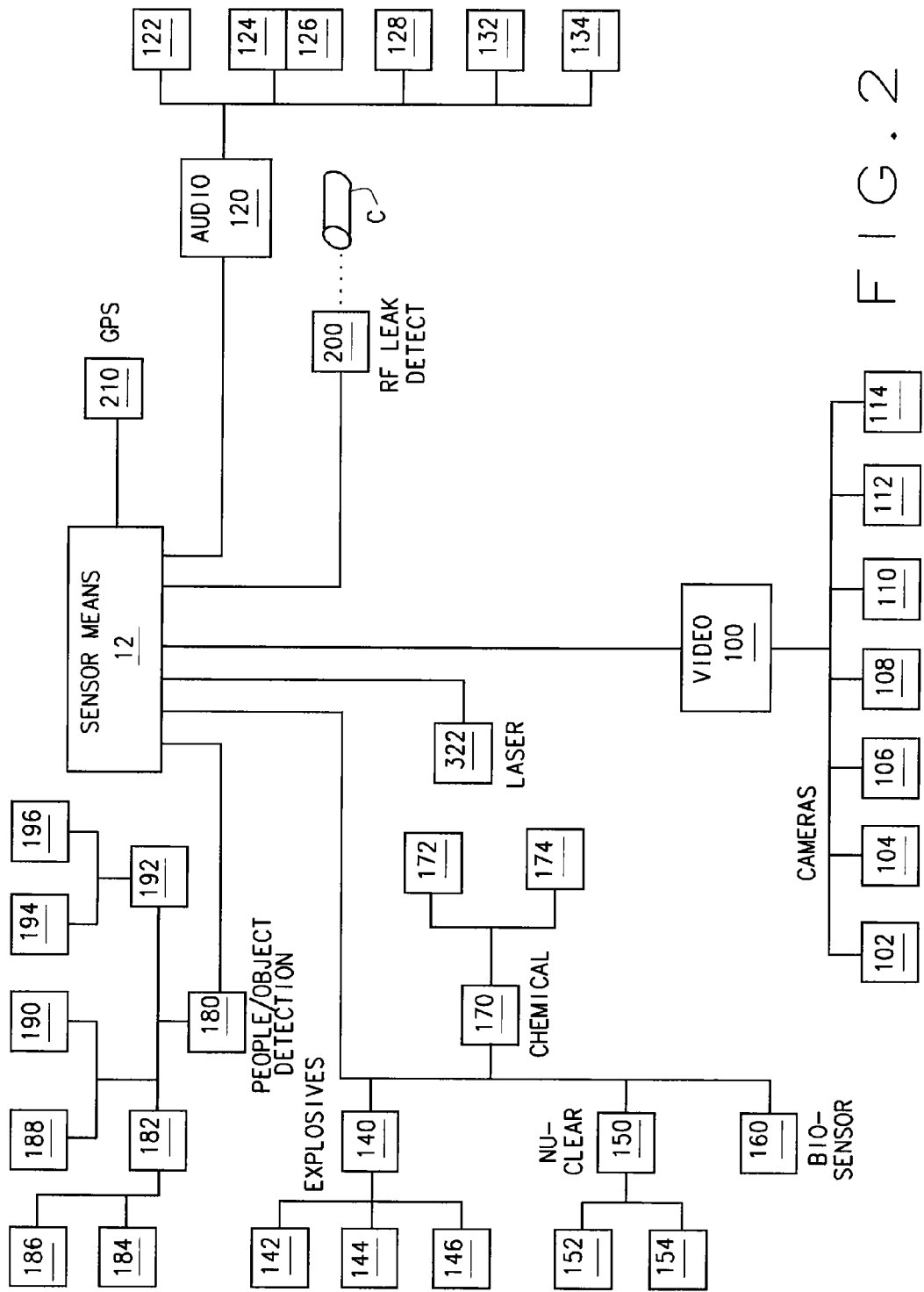
FIG. 2 illustrates a sensor suite comprising various sensors, detectors, and other elements used with the surveillance system.
Figure 4:
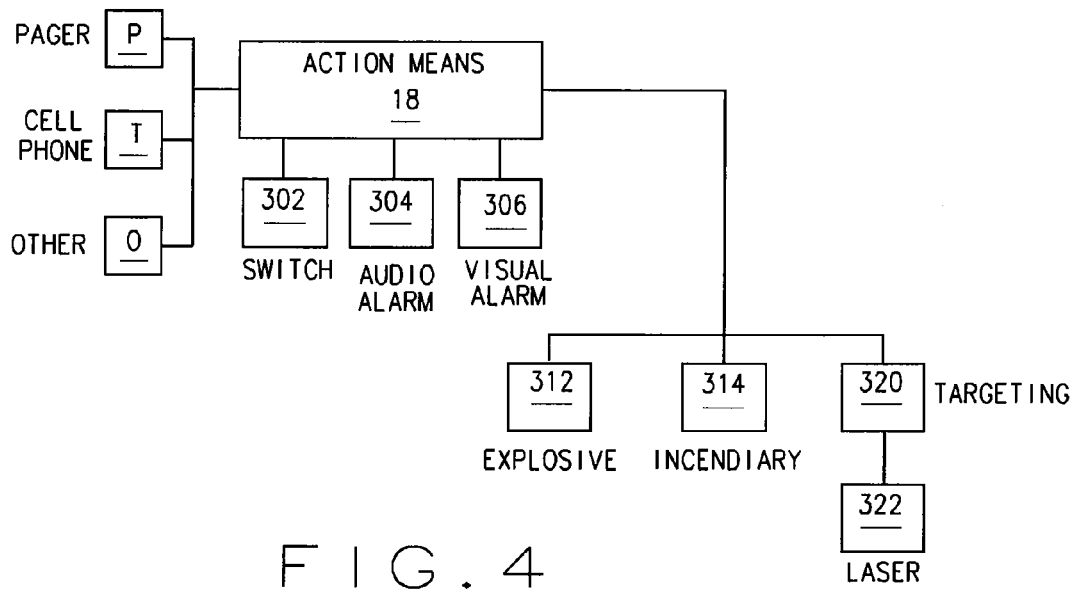
FIG. 4 illustrates a variety of devices used in conjunction with the surveillance system to perform various activities in response to outputs from the surveillance system; and, FIG. 5 illustrates various ways in which power is supplied to the surveillance system.
Figure 5:
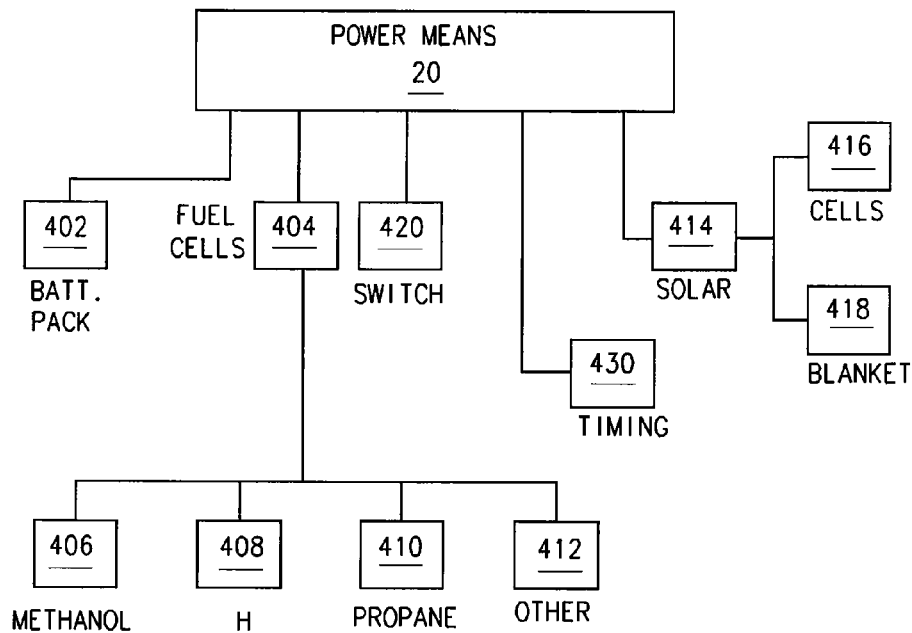

In more detail now, and referring to FIG. 2, as noted, sensor means 12 comprises a suite of sensors, detectors, and other devices by which various types of information pertinent to the remote location under surveillance is obtained. These units are implemented in hardware, as well as in software and firmware.

A first type of information is visual information, and to do this, sensor means 12 includes an imaging means 100 for capturing visual images of the location and of people, animals, and objects positioned about or moving through location A. Imaging means 100 utilizes one or more conventional cameras 102, particularly digital cameras, for this purpose, as well as specialized cameras. These latter include miniature video cameras 104 which are particularly adapted for covert usages of surveillance system 10. Other types of cameras include charge coupled device (CCD) cameras 106, and metal oxide semiconductor (CMOS) cameras 108. Other types of cameras which are used with surveillance system 10 include vidicon/tube type cameras 110, infrared sensitive cameras 112, and multi-mode very low light cameras 114. These latter may have either analog or digital output formats. Regardless of the imaging means employed, the cameras are high resolution cameras and operate in more than one mode depending upon how they are configured with regard to the location in which they are placed.

Next, sensor means 12 comprises audio detection means 120. This detection means includes microphones 122 which can pick up a wide range of noises. For example, a microphone 122 is capable of sensing soft or muffled noises such as someone walking on sand, as well as loud noises including gunfire and explosions. To reduce extraneous noise, the microphones are placed as close as possible to those areas where it is expected to pick-up sounds or noises of interest. It is further a feature of audio detection means 120 that in addition to detection of a noise, the means further accurately identifies the location of the noise source. This information is transmitted to the distant location, together with the sounds, so the user can not only hear what is being said, if the noise is speech, or other sound, but precisely know where, within location A, the sound originates. If the sound is emanating from a vehicle moving through the area of location A, the sound will be sequentially tracked from one listening device to another. This then allows the user to know the direction a vehicle, or vehicles, is coming from and the direction in which it is going. Since the devices are sufficiently sensitive that they detect soft noises, even the movement of animals is tracked in this manner.

The microphones used with surveillance system 10 include wireless microphones 124 which incorporate a transmitter 126 that is part of transmission means 14. Other types of microphones used include condenser microphones 128, dynamic microphones 132, and ribbon microphones 134. Again, it will understood by those skilled in the art that the type or types of microphones used at location A depends upon a number of factors including whether surveillance system 10 is being used in an overt or covert manner.

Since the sounds picked up by the microphones used comprise analog signals, for transmission purposes, it is convenient to first convert them into digital signals. This may also include compression of the signals. This conversion and compression is performed using analog to digital converters and a visual or audio codec as discussed hereinafter.

Regardless of whether used in an overt or covert manner, surveillance system 10 is used in locations where various types of dangerous materials or agents may be present. In war or combat zones, there is a high probability that explosives may be present. It may also occur that nuclear, biological, or chemical agents or materials might be present. These agents or materials are collectively referred to as "NBC" agents. In civilian situations, the detection of a toxic chemical spill, for example, may have significant implications regarding the safety of humans and livestock in the affected area. While probably less common, the presence of explosives, biological agents or nuclear materials may also need to be determined.

Accordingly, sensor means 12 includes a detector 140 for detecting the presence of explosive agents at the location. Detector 140 is implemented using different types of explosive sensors depending upon the type of detection most appropriate for a particular installation. For example, detector 140 includes sniffer type or similar detectors 142 that detect vapors given off by explosive materials, as well as fixed station explosive detectors 144, portable (hand held) detectors 146, and miniature detectors 148 which are incorporated into overt or covert sensor packages.

Detection of nuclear materials is done using a detector 150. Detector 150 includes, for example, a Geiger counter 152, and various types of particle detectors 154 such as neutron or gamma ray detectors. A biosensor 160 is used to detect biological agents. The presence of chemical agents is sensed using a detector 170. Detector 170 is implemented using a sniffer type sensor 172, as well as detectors 174 which produce a chemical reaction when contacted by particular chemical agents of interest.

It is a feature of the surveillance system of the present invention that it is responsive to an alarm output from any of the detectors 140, 150, 160, or 170 in response to the presence of an agent or material at location A to direct a camera to the point where the presence of the agent or material is detected. This allows the users to observe, in real time, what the agent or material is, if it is being dispersed (e.g., a toxic agent leaking from a drum), being mixed or otherwise assembled into, for example, an explosive or incendiary device, or being stored at that location for subsequent use, dispersal, or disposal.

Next, sensor means 100 includes a detector 180 for detecting ground and aerial movement of people, animals, and objects. Detector 180 includes, for example, a motion detector 182. Motion detector 182 includes both optical detectors 184 and acoustical detectors 186. It also includes a ground based radar 188, and a passive infrared detector 190.

Detector 180 further includes a metal detector 192. The metal detector includes both a beat frequency oscillator (BFO) type detector 194, and a pulse induction type oscillator 196.

In covert surveillance installations, system 10 interfaces with a concealed cable system C. The cable system "leaks" RF waves. When a person, animal, or object such as a vehicle, for example, passes over or next to the cable system, a change in the state of the waves occurs, and sensor means 12 includes a detector 200 which detects this change in state. As before, the surveillance system 10 is responsive to this change in state to direct an imaging means to the site where the change occurred to view the person, animal, or object detected.

Supplementing sensor means 12 is a global positioning system (GPS) 210 by which the location of each sensor, detector, or other device comprising the sensor means is precisely identified. As indicated above, this information is transmitted to distant location B, together with the outputs from the sensor means. At location B, the location information is displayed to the user together with the other sensor information. Again, this enables the user to discern the precise location where an activity is occurring at location A when the output from that sensor, detector, or device is displayed.

As previously discussed, surveillance system 10 can be implemented as a covert system. In such installations, the various means comprising sensor means 10 located at remote location A are appropriately concealed to prevent their detection by those under surveillance. Concealments for these means are shown and described in co-pending, co-assigned U.S. patent application Ser. No. 12/475,167. It will be understood by those skilled in the art, that because of the need for concealment, several of the sensors, detectors, and other devices described above are packaged together or installed in the same concealment as other sensors, detectors, and other devices.

As previously indicated, the output from the various sensors, detectors, and other devices are, in most instances, analog signals. Transmission means 14 first includes one or more analog-to-digital (ADC) converters 30 for converting these analog signals into digital signals. After conversion, the outputs from ADCs 30 are supplied to a codec unit 32 which includes both a visual and audio codec. Here, the data or information is encoded or encrypted into a secure format including, for example, an Internet protocol (IP) format. After encoding, the information is formed into packets by a packetizing means 34 for transmission of the information and data by transmission means 14 to location(s) B.

Figure 3:
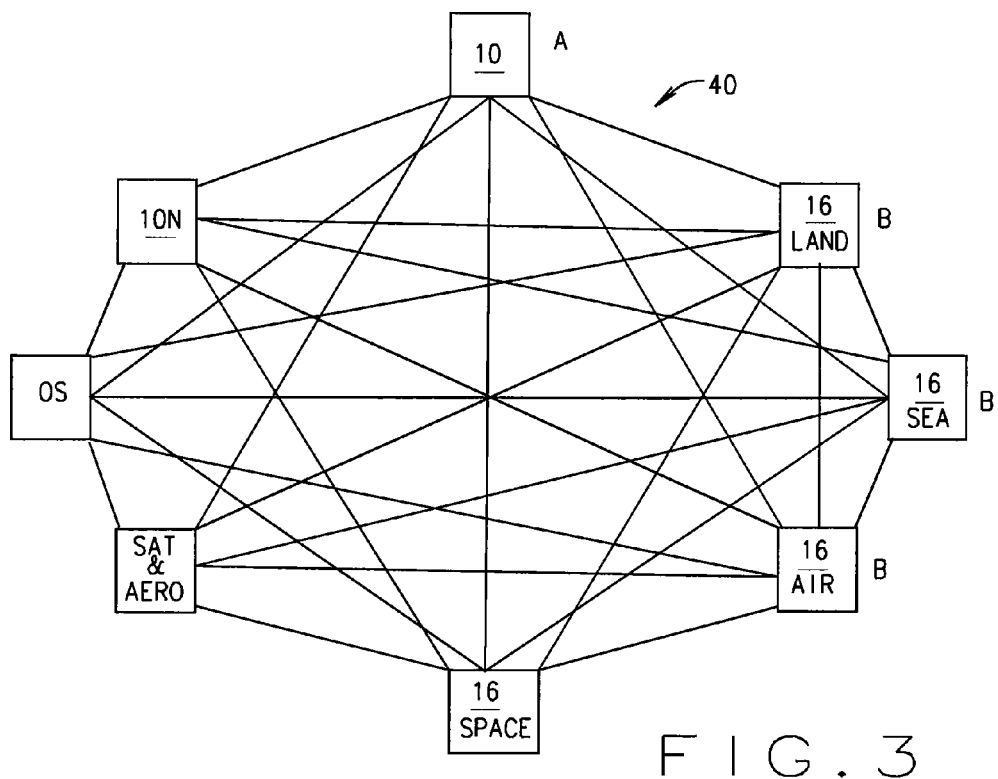
FIG. 3 illustrates the transmission capabilities of the surveillance system to communicate with a variety of viewing sites located on different platforms.

For transmission purposes, the encrypted, packetized digital signals are converted into microwave signals for transmission by a microwave transceiver 36 of transmission means 14. The transmission means communicates with location B in a number of ways. One is a point-to-point microwave communications pathway. A second is by a point-to-multipoint microwave communications pathway. Importantly, and as shown in FIG. 3, transmission means 14 incorporates a comprehensive mesh topology 40 that provides multiple communication paths between locations A and B by which point-to-point and point to multipoint communications are achieved. The importance of employing the mesh topology is that now, real time information is continuously provided to users at a distant location B, regardless of whether that is a land, sea (marine vessel), air, or space platform (satellite, space station), and regardless of any breakdowns or problems which may occur in a particular communications pathway. The mesh topology further enables surveillance system 10 to communicate with other surveillance systems 10N, other non-surveillance systems OS, as well as communicate via satellites (SAT), and aerostats (AERO) including balloons, kites, drones and other unmanned aircraft, etc. Accordingly, the information provided by surveillance system 10 is simultaneously transmitted to more than one distant location for simultaneous viewing by users at each location.

Transmission system 10 facilitates communication over a wide range of frequencies and within a number of different frequency bands. For example, transmission means 14 operates in at least one frequency band within the frequency range of between 300 MHz and 40 GHz.

The display means 16 at each distant location B includes a transceiver 46 which receives and converts the transmitted information from remote location A into a video display format for its simultaneous display, in real time, to the one or more users of system 10. The display includes the visual images obtained from the cameras at the remote location, any audio, and the outputs from the other sensors, detectors, and devices at the location. The transmitted information is also recorded, stored, and archived for future use.

As noted above, the displayed information also pinpoints the location about the remote site where this information is gathered. Thus the user instantaneously is apprised of all activities at location A; or, if nothing is happening at the location, that information as well. Since the transmission path is a two-way path, the user can remotely communicate with location A to, for example, pan, tilt, and zoom (PTZ) a camera to better observe what is going on.

Other features of transmission system 14 include the provision of voice over IP (VOIP) telephony for communications between surveillance system 10 and other systems OS. Further, the video display format into which the information is converted enables a user to view the information with a hand held video display 48 (see FIG. 1) or mobile display 50 (also see FIG. 1) such as a troop carrier or mobile command post in military environments, or police cars, fire engines, and ambulances, in civilian applications.

In response to the video and other displayed information, a user of surveillance system 10 can elect to take no action with respect to location A; or, they make decide to take an action they consider appropriate under the circumstances. In this latter regard, system 10 includes the action means 18. The action means includes a plurality of devices of various types located at remote location A. The respective devices perform particular predetermined functions in response to the command from location B given as a result of the information displayed to the user. Those skilled in the art will understand that because of the different environments (military v. civilian) in which the surveillance system is used, the menu of devices for use in the one environment will differ in many respects from that for use in the other environment. As but one example, in a civilian application, surveillance system 10 may include a switching means 302 which switches electrical power from a main to a backup system for a hospital, traffic control signals, etc. In a military application, the same switching means may be used to trigger an explosive device.

Besides exercising the action means in response to a signal from a user of surveillance system 10, an action means may be programmed to carry out its designated function in response to the occurrence of a predetermined event sensed by a sensor means located at remote location A. For example, switch means 302 is programmable so that when a camera detects the occurrence of a power outage; i.e., the traffic lights go dark, an appropriate output from the sensor means to the action means, results in switch means 302 being activated to connect the back-up power source to the traffic signals.

Further in this regard, switch means 302 may be programmable so that the action means performs the function in response to the occurrence of a series of predetermined events sensed by the sensor means at the remote location. In this instance, with respect to the previous example, switch means 302 is programmed so that it does not connect the back-up power source to the traffic signals until a) the traffic signals have gone dark, and b) they have remained dark for a specified period of time. This sequence of events not only takes into account the failure of the main power source to power the signals, but also the failure, over the specified period of time, for some other switching mechanism to affect connection of the back-up power source to the signals.

The devices comprising action means 18 for overt installations of surveillance system 10 include, for example, the switch means 302 previously discussed. Another device is an audio alarm 304 which signals, for example, the presence of toxic chemicals or other dangerous condition. The alarm emits a tone or series of tones, or a prerecorded message warning people to keep out of the area. A visual alarm 306 illuminates a light or warning sign, or a word or a phrase, signaling the area about the alarm is dangerous and should be avoided.

In civilian applications, surveillance system 10 is used overtly, and the devices which comprise action means 18 are typically not concealed. This does not mean that they, or other components of the system, are out in the open, only that no attempt is normally made to conceal or hide them. Exceptions to this are when the sensors, detectors, or other devices comprising sensor means 12 and the devices comprising action means 18 are installed, for example, in high crime areas or points along our border where people illegally enter the United States or drugs are smuggled into the country.

Most often, however, in military installations surveillance system 10 is a covert system. Here, the devices comprising action means 18 are clandestine devices hidden at location A in a manner similar to that in which the sensors, detectors, or other devices comprising sensor means 12 are hidden. In some instances, the clandestine devices are hidden in the same concealments that house the respective sensor means.

Action devices 18 include, for example, the switch means 302 previously mentioned. Now, however, the switch means is used switch on or off various devices including particular types of sensors. The action means further comprises various types of explosive devices 312 and incendiary devices 314. These device are remotely actuated (i.e., detonated) in response to a command sent by a user from location B, or locally actuated in response to the occurrence of a predetermined event, or the occurrence of a series of predetermined events.

Surveillance system 10 includes a targeting means 320 located at location A targeting a person or an object at the remote location. The targeting means is, for example, a laser 322. Laser 322, in addition to its use in targeting explosive devices 312 and incendiary devices 314 is also, as previously discussed, responsive to the alarm output from any of the explosive or NBC detectors 140, 150, 160, or 170, due to the presence of the respective agent or material at location A to direct a camera to the site where the agent or material is detected.

With regard to the remote annunciation of an action means device, surveillance system 10 enables the user to remotely monitor real time status and acknowledge receipt of the status change using a pager P or a cellular telephone T or other type device O.

It is a feature of surveillance system 10 that its power means 20 includes a power source at remote location A that is capable of powering the surveillance system for extended periods of time before having to be replaced or replenished. In this regard, power means 20 employs a battery pack 402. Alternatively, power means 20 also includes fuel cells 404. Among the types of fuel cells usable with surveillance system 10 are methanol fuel cells 406, hydrogen based fuel cells 408, propane fuel cells 410, as well as other exotic fuel cells 412. Power means 20 also has a solar power system 414. This includes solar cells 416 and solar blankets 418. The effect of using such extended life power sources is that it provides both quick and efficient operation of the various components comprising surveillance system 10; while, as noted, powering the system for long periods of time without having to be serviced.

Those skilled in the art will appreciate that various power components can be used in combination. Thus, for example, in areas where the sunlight is plentiful, one of the solar power sources may be used. However, an alternate power source is also used, so on cloudy days, or if the surveillance system is used in locales, or at the time of year, where days are relatively short, the solar based power supply is timely switched over to another power supply. For this purpose, power means 20 uses a sensor and switch 420 to switch from the one power source to the other.

Power means 20 includes a timing means 430 which enables a sleep mode for surveillance system 10 during which the system is deactivated. This helps conserve power. When the sleep period is over, and timing means 430 activates the system, the system is powered up in a predetermined operating configuration or status. In addition to timing means 430, power means 20 is further responsive to a remote signal to power up and power down the surveillance system.

As previously noted, besides timing means 430, surveillance system 10 includes an activation means 22 which is responsive to an alarm or signal received from a predetermined source such as a user of the system, or from another location, for activating the system. In addition to a signal or alarm from a user located at a land base, a vessel at sea, or an aerial platform, the signal can also be sent from a space platform. Further, activation means 22 is responsive to an alarm transmitted from cellular telephone T.

Regardless of how activated, once activated, surveillance system 10, using an interface means 24, now interfaces with other surveillance systems 10N which communicate with the same distant location; and land, sea, air, and space based platforms by which information is transmitted to the user in the predetermined, secure format and displayed for users at those locations using display means 16.

What has been described is covert and surveillance system 10 for obtaining real time video and audio at a remote location as well as a variety of other pertinent information using sensors, detectors, and other appropriate devices. These detect not only the presence of humans, but animals, vehicles and other metallic and non-metallic objects. Explosive and other NBC agents and materials are also sensed. The wide variety of sensors, detectors, and other devices available for use in the surveillance system provide the system a great degree of flexibility with respect to monitoring a remote site and responding to occurrences, or non-occurrences at the site.

The video, audio, and other information obtained is securely transmitted from the remote location to one or more distant locations for simultaneous, real time, viewing and listening by one or more users. For this purpose, the surveillance system incorporates a mesh topology so the information is timely provided despite any breakdowns or problems in a particular communications pathway. The mesh topology effectively links disparate systems together into a comprehensive communications system that provides two-way communications, including two-way voice communication.

In covert applications, surveillance system 10 utilizes with small, clandestine devices which may include explosive and incendiary devices which are detonated in response to a remote command or the occurrence of one or more predetermined actionable events. Other type devices can also be remotely activated or activated in response to the occurrence of one or more predetermined events.

The system is battery powered, but can also be powered using other sources that do not require frequent attention to the platform. Particularly in covert environments, the system can be left unattended for long periods of time without affecting its overall performance.

The components of the system are readily transported and the system can be quickly set-up and made operational at a remote location. When no longer required, the system is quickly dismantled for transport, installation, and use at another site.

In view of the above, it will be seen that the several objects and advantages of the present disclosure have been achieved and other advantageous results have been obtained.

Having thus described the invention, what is claimed and desired to be secured by Letters Patent is:

1. A surveillance system for observing a remote, permanent location and providing information about events occurring at that location comprising:

sensor means fixedly installed at the remote location for obtaining real time information about the location which is used to make a threat assessment of activities occurring at the location and determine what action, if any, is to be taken if the assessment results in the determination of an imminent threat, the sensor means including at least one video sensor used in combination with one or more user selected sensors which include an audio sensor, sensors for detecting the presence of people and objects, chemical, biological, and/or nuclear sensors, and explosives sensors, the respective sensors being used in a desired combination depending upon the location under surveillance to obtain different types of information necessary to determine what is happening, or not happening, at the location in order to perform the real time threat assessment;

sensing means for precisely identifying the location of each of the sensors;

transmission means for converting outputs from the respective sensors into a secure or encrypted format and for transmitting the resultant information from the remote location to another location distant therefrom using an encrypted internet protocol standards based radio frequency transmission network in a point-to-point, point-to-multipoint, or mesh network configuration; and, display means at the distant location for converting the information received at the distant location into a video display format and for displaying the information, in real time, to at least one user for real time viewing in a fixed, portable, or mobile display configuration of the information by the user for the user to perform the threat assessment at the remote location and to be able to immediately respond to what is happening, or not happening, at the remote location and to undertake appropriate action in response to the immediate situation at the remote location.

2. The surveillance system of claim 1 which is responsive to an alarm output from any of the detectors in response to the presence of an agent or material at the location to direct an imaging means to the location where the presence of the agent or material is detected.

3. The surveillance system of claim 1 in which the sensor means further includes a motion detector for detecting ground and aerial movement of people, animals, metallic and non-metallic objects.

4. The surveillance system of claim 1 in which the sensor means further includes a metal detector for sensing metal objects.

5. The surveillance system of claim 1 in which the sensor means further includes a passive infrared detector detecting objects in the vicinity of the sensor means.

6. The sensor means of claim 1 in which the audio detection means includes means detecting loud noises including gunfire and explosions, and the sensor means further includes means for locating the location of any noises.

7. The surveillance system of claim 1 in which the sensing means for precisely identifying the location of each of the sensors includes a global positioning system by which the location of each sensor means is identified and transmitted to the distant location for display to the user whereby the user can discern the precise location where an activity is occurring at the remote location when an output from the sensor means is displayed.

8. The surveillance system of claim 1 further including a radar for detecting the movement of people, animals, and objects, the surveillance system being responsive to an output from the radar to direct an imaging means to the site where the presence of the person, animal, or object is detected.

9. The surveillance system of claim 1 which interfaces with a concealed cable system that leaks RF waves, a change in the state of the waves being detected when a person, animal, or object passes adjacent the cable system, the surveillance system being responsive to the change in state to direct an imaging means to the site where the presence of the person, animal, or object is detected.

10. The surveillance system of claim 1 which is a covert system in which the means comprising the sensor means located at the remote location are concealed in an appropriate manner to prevent their detection by those under surveillance.

11. The surveillance system of claim 1 in which outputs from the sensor means are analog signals and the transmission means includes:
   an analog-to-digital converter converting the analog signals to digital signals;
   means forming the analog signals into encrypted packets of information; and
   a transmitter transmitting the packets of information to the distant location.

12. The surveillance system of claim 1 in which the transmission means further provides VOIP telephony for communications between the surveillance system and another system with which the surveillance system communicates.

13. The surveillance system of claim 12 in which information is simultaneously transmitted to more than one distant location for simultaneous viewing by users at each location.

14. The surveillance system of claim 1 in which the video display format into which the information is converted enables a user to view the information with one of a hand held video display or a mobile video display.

15. The surveillance system of claim 1 in which the transmission means further includes a two-way voice communications capability.

16. The surveillance system of claim 1 in which the transmission means operates in at least one frequency band within the frequency range of 300 MHz to 40 GHz.

17. The surveillance system of claim 1 further including action means located at the remote location for performing a predetermined function in response to a command from the distant location, the command being sent as a result of the information displayed to the user at the distant location and an action taken in response thereto, the action means performing the function in response to the occurrence of a predetermined event sensed by the sensor means at the remote location.

18. The surveillance system of claim 17 in which the action means further performs the function in response to the occurrence of a series of predetermined events sensed by the sensor means at the remote location.

19. The surveillance system of claim 18 in which the surveillance system is a covert surveillance system and the action means comprises at least one clandestine device hidden at the remote location.

20. The surveillance system of claim 18 in which the action means comprises an explosive device which is detonated in response to one of:
   the command from the distant location;
   the occurrence of the predetermined event;
   the occurrence of the series of predetermined events.

21. The surveillance system of claim 19 in which the action means comprises an incendiary device which is actuated in response to one, or a combination, of:
   the command from the distant location;
   the occurrence of the predetermined event;
   the occurrence of the series of predetermined events.

22. The surveillance system of claim 18 in which a user remotely activates and deactivates the action means using a pager or a cellular telephone.

23. The surveillance system of claim 18 further including targeting means at the remote location for targeting a person or object thereat and including a laser.

24. The surveillance system of claim 1 further including power means for powering the surveillance system and including a sleep mode during which the surveillance system is deactivated thereby to conserve power, timing means to power up and power down the surveillance system, and when the surveillance system is powered up, the power means powering it up in a predetermined operating configuration.

25. The surveillance system of claim 24 in which the power means further is responsive to a remote signal to power up and power down the surveillance system.

26. The surveillance system of claim 24 in which the power means includes a power source capable of powering the surveillance system for extended periods of time before having to be replaced or replenished.

27. The surveillance system of claim 1 further including activation means responsive to an alarm received from a predetermined source for activating the surveillance system including an alarm transmitted from the distant location.

28. The surveillance system of claim 27 in which the activation means is further responsive to an alarm transmitted from a cellular telephone.

29. The surveillance system of claim 1 in which the transmission means transmits the resultant information using a non-public, secured and encrypted network.

\* \* \* \* \*